Figure 1:
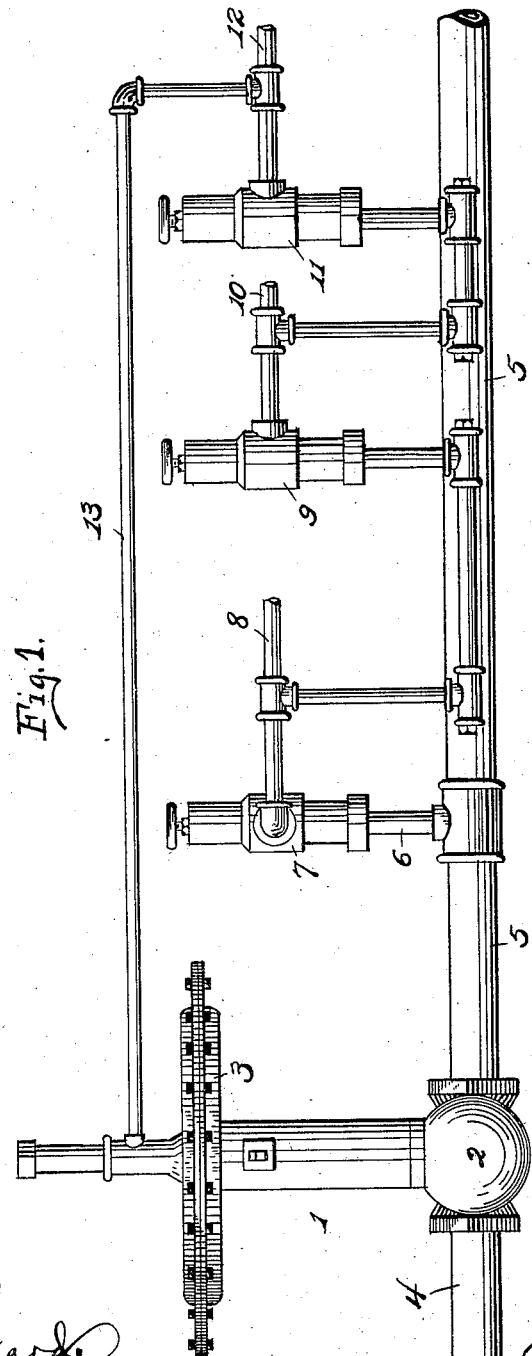

No. 845,424. PATENTED FEB. 26, 1907.
J. LAVELLE.
PRESSURE REGULATING SYSTEM.
APPLICATION FILED NOV. 26, 1906.

2 SHEETS—SHEET 1.

WITNESSES:

INVENTOR
John Lavelle.

No. 845,424. PATENTED FEB. 26, 1907.
J. LAVELLE.
PRESSURE REGULATING SYSTEM.
APPLICATION FILED NOV. 26, 1906.
2 SHEETS—SHEET 2.
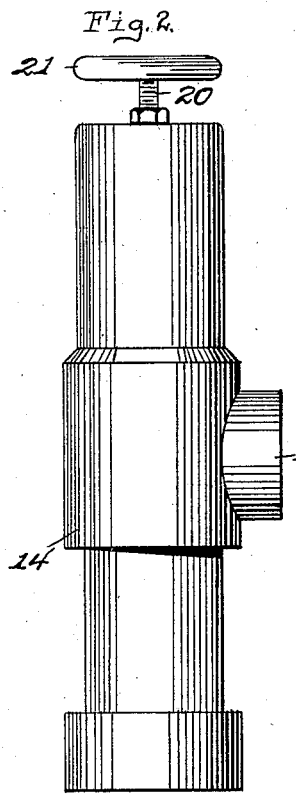
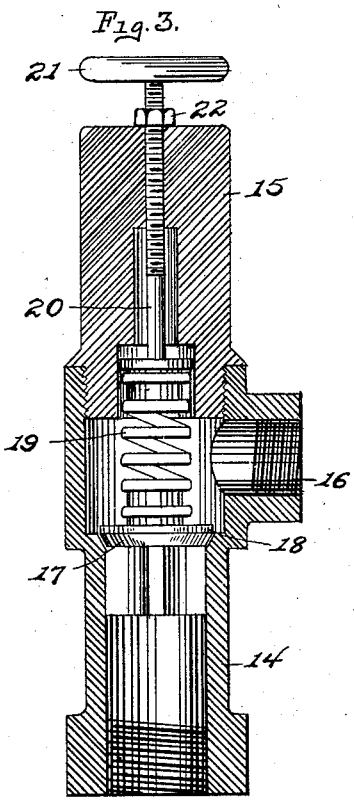
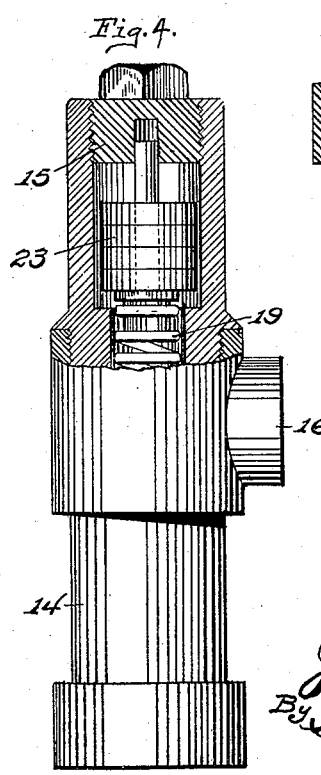
WITNESSES:
INVENTOR
John Lavelle.

UNITED STATES PATENT OFFICE.

JOHN LAVELLE, OF UNIONTOWN, WEST VIRGINIA.

PRESSURE-REGULATING SYSTEM.

No. 845,424.  Specification of Letters Patent.  Patented Feb. 26, 1907.

Application filed November 26, 1906. Serial No. 345,097.

*To all whom it may concern:*

Be it known that I, JOHN LAVELLE, a citizen of the United States of America, and a resident of Uniontown, county of Wetzel, and State of West Virginia, have invented certain new and useful Improvements in Pressure-Regulating Systems, of which the following is a specification.

My invention relates to a new and useful improvement in pressure-reducing systems, and more particularly to a regulating system for gas whereby the gas-pressure in one or more branc hlines may be regulated and at the same time the gas-pressure in the main line beyond the branches may be regulated.

The object of my invention is to provide a regulating system for gas whereby the pressure in one or more branch lines may be reduced to any low pressure desired and whereby at the same time the pressure in the line or lines beyond the branch-line connections may also be regulated. To illustrate, no matter what the well or line pressure may be the invention may be utilized to reduce the pressure in one or more branch lines to any desired amount, and any desired pressure from the lowest to the said well or line pressure may at the same time be maintained in the main line beyond the branch-line connections.

In the method heretofore employed for reducing gas-pressure to a low pressure suitable for a house only the desired house-pressure was permitted to pass the regulator, and therefore the line beyond the regulator carried the same pressure which was carried by the house or branch line. As a result each branch line to a house or other place where low pressure was desired required a separate regulator, the diaphragm of which was connected by pipe with the branch line.

By my invention with but one regulator I regulate to a nicety not only the pressure in a branch line or lines, but also the pressure in the main line beyond the branch connections, so that any desired pressure up to the well or line pressure may be maintained therein.

In describing my invention in detail reference is herein had to the accompanying drawings, forming a part of this specification, in which—

Figure 1 is a side elevation of a main line with low-pressure regulator, illustrating my invention. Fig. 2 is a similar elevation of an adjustable controlling-valve used on the branch lines. Fig. 3 is a vertical section through said valve, and Fig. 4 is a partial vertical section illustrating a modification in the construction of said valve.

In said drawings like reference-numerals designate like parts throughout the several views.

Referring to said drawings, 1 indicates a pressure-reducing regulator of an ordinary type, preferably a low-pressure house-regulator, in which 2 is the regulating-valve, and 3 the diaphragm. 4 indicates the main line leading to the said regulator, and 5 said line beyond or leading from said regulator.

6 is an upright pipe connected with the line 5 beyond the regulator 1, which has mounted thereon an adjustable pressure-controlling valve 7. To said valve 7 is connected, as shown, a branch line 8.

Branching off from the branch line 8, as shown, is a line of suitable connections leading through a second adjustable pressure-controlling valve 9 to a second branch line 10, and branching off from the branch line 10 in a similar manner is a line of suitable connections leading through a third valve 11 to a third branch line 12. The connecting of further branch lines may in like manner be continued indefinitely. To the last branch line in the series is connected a line 13 of pipe leading to the diaphragm 3 of the regulator 1. Said diaphragm controls the regulator-valve 2 in the ordinary manner and, through said valve 2, the adjustable valves 7 9 11, &c., on the branch lines, as will hereinafter be explained.

The controlling-valves 7, 9, and 11 are or may be of any desired type or construction which admits of adjustment against pressure. In the illustrations Figs. 3 and 4 I show two preferred constructions of said valve. In Fig. 3, 14 indicates a casing, adapted to be secured on the end of an upright pipe 6 by screwing the same thereon. Within the upper end of the casing 14 is secured a plug 15, and in the side of said casing is provided an opening 16, in which the branch line is adapted to be connected. A valve-seat 17 is provided in said casing below the opening 16, on which a drop-valve 18 is normally held seated by a spring 19, the lower end of which is seated on said drop-valve 18 and the upper end of which is in engagement with the lower end of a rod 20, which extends upward through said plug 15 and has a hand-wheel 21 on its upper end, by which it is manipulated. Both the rod 20 and the opening through the plug 15 are threaded, as shown. Hence by manipulating said rod the tension of the spring 19 upon the drop-valve 18 is regulated or adjusted. A securing-nut 22 is provided on said rod 20, by which said rod is held against retraction.

In the modification shown in Fig. 4 substantially the same construction as above described is employed, the only difference being that weights 23 are employed to regulate or adjust the pressure on the drop-valve 18 instead of the screw-tension device. However, as hereinbefore stated, the valves employed may be of any desired adjustable construction, and I do not desire to limit or confine myself to the precise type or construction herein shown and described, those shown being simply preferred because of their simplicity and adaptation for the purpose.

Now in adjusting my invention for operation the regulator 1 is first set or adjusted for the desired pressure in the last branch line in the series—that is, in the present case in the line 12—this pressure being conveyed to the diaphragm 3 through the line 13. The valve 7 is then adjusted to the pressure desired in the line 5 beyond the regulator—that is, the tension on the drop-valve 18 is adjusted so that the pressure in the line 5, acting on the under side thereof, will raise said drop-valve and at the same time give the desired pressure in the line 5. Then in like manner the valve 9 is adjusted to the desired pressure in line 8. Then the valve 11 is adjusted to the pressure desired in the line 10, and so on to the end of any series of branch lines. To further illustrate, assuming that the main line or well pressure carried by the line 4 is one hundred pounds and that it is desired to carry fifty-pounds pressure in the line 5, the valve 7 is adjusted to a fifty-pound pressure. Then assuming that it is desired to carry a twenty-five-pound pressure in the branch line 8 the valve 9 is adjusted to a twenty-five-pound pressure. Continuing, if it is desired to have a ten-pound pressure in the line 10 the valve 11 is adjusted, as above described, to said ten-pound pressure, and so on indefinitely to the end of the series of branch lines employed, connecting at a point beyond the last valve used a pipe leading to the diaphragm 3 of the regulator 1 which regulator is adjusted to give the desired pressure in the last branch in the series. Each adjustable pressure-controlling valve in the series controls the pressure in the branch in which it is seated.

It will be seen from the foregoing that with my system any number of branch lines may be connected between the valve 2 of the regulator 1 and the diaphragm 3 thereof and that the pressure in each may be regulated or adjusted as desired, and at the same time any pressure up to the main-line pressure may be maintained in the line 5 beyond the regulator. However, it is of course impossible to obtain a higher pressure in any branch line than that to which the pressure-controlling valve preceding it has been adjusted, or, in other words, if the pressure maintained in different branch lines is different said pressure decreases from the first to the last branch in the series, the lowest pressure being in the line ending the series.

Having thus described my invention, what I claim as new, and desire to secure by Letters Patent, is—

1. In a regulating system of the character described, the combination with a main line, of a pressure-reducing regulator mounted on said main line, a series of connected branch lines between the main line beyond said regulator and the diaphragm of the latter, and an adjustable pressure-controlling valve in each of said branch lines, substantially as described.

2. In a regulating system of the character described, the combination with a main line, of a pressure-reducing regulator on said main line, and a series of connected branch lines each provided with pressure-regulating means for controlling the pressure therein, and the last branch line in said series connected with the diaphragm of said regulator, substantially as described.

3. In a pressure-regulating system of the character described, a main high-pressure line, a pressure-reducing regulator on said line, a plurality of branch lines beyond the regulator, said branch lines connected in a series one branching from another, adjustable pressure-controlling means in each of said branch lines, and a pipe connecting the last of the series of branch lines with the diaphragm of the regulator.

4. In a pressure-regulating system of the character described, a main line, a pressure-reducing regulator on said main line, a plurality of branch lines beyond the regulator, said branch lines forming a connected series extending from the main line to the diaphragm of the regulator, each branch line being a branch of the branch line preceding it, and means carried by each branch line whereby it may be adjusted to permit a desired pressure to pass therethrough, substantially as described.

Signed by me at Uniontown, West Virginia, in the presence of two subscribing witnesses.

JOHN LAVELLE.

Witnesses:
P. H. GLOVER,
A. MOLLOHAN.